FIG.I.

INVENTOR
ERNEST WILLIAM PHILLIPS
BY Young + Thompson
ATTORNEYS

March 2, 1971   E. W. PHILLIPS   3,566,720
INDEXING MEANS

Filed June 10, 1968   4 Sheets-Sheet 2

INVENTOR
ERNEST WILLIAM PHILLIPS
BY
Young + Thompson
ATTORNEYS 3,566,720
INDEXING MEANS
Ernest William Phillips, Coventry, England, assignor to
Rutter Tools Limited, Coventry, England
Filed June 10, 1968, Ser. No. 735,855
Claims priority, application Great Britain, July 12, 1967,
31,976/67
Int. Cl. B23b 39/06
U.S. Cl. 77—64                                   9 Claims

ABSTRACT OF THE DISCLOSURE

Means for indexing a machine table arranged for two-dimensional movement in its own plane, comprising detent means which are fixed in the sense that they do not move with the table and an index plate for attachment to the table. The plate is formed at specific positions for engagement by the detent means which thereby locate the plate and hence the table in any one of the corresponding index positions so that the table can be securely clamped or locked in position while so located. In a preferred construction of machine table employing the invention the index plate is attached beneath the table and has holes bored at the index positions which are selectively engageable by a pneumatically-operated plunger fixed to a base beneath the table and on which the latter is mounted.

Figure 1:
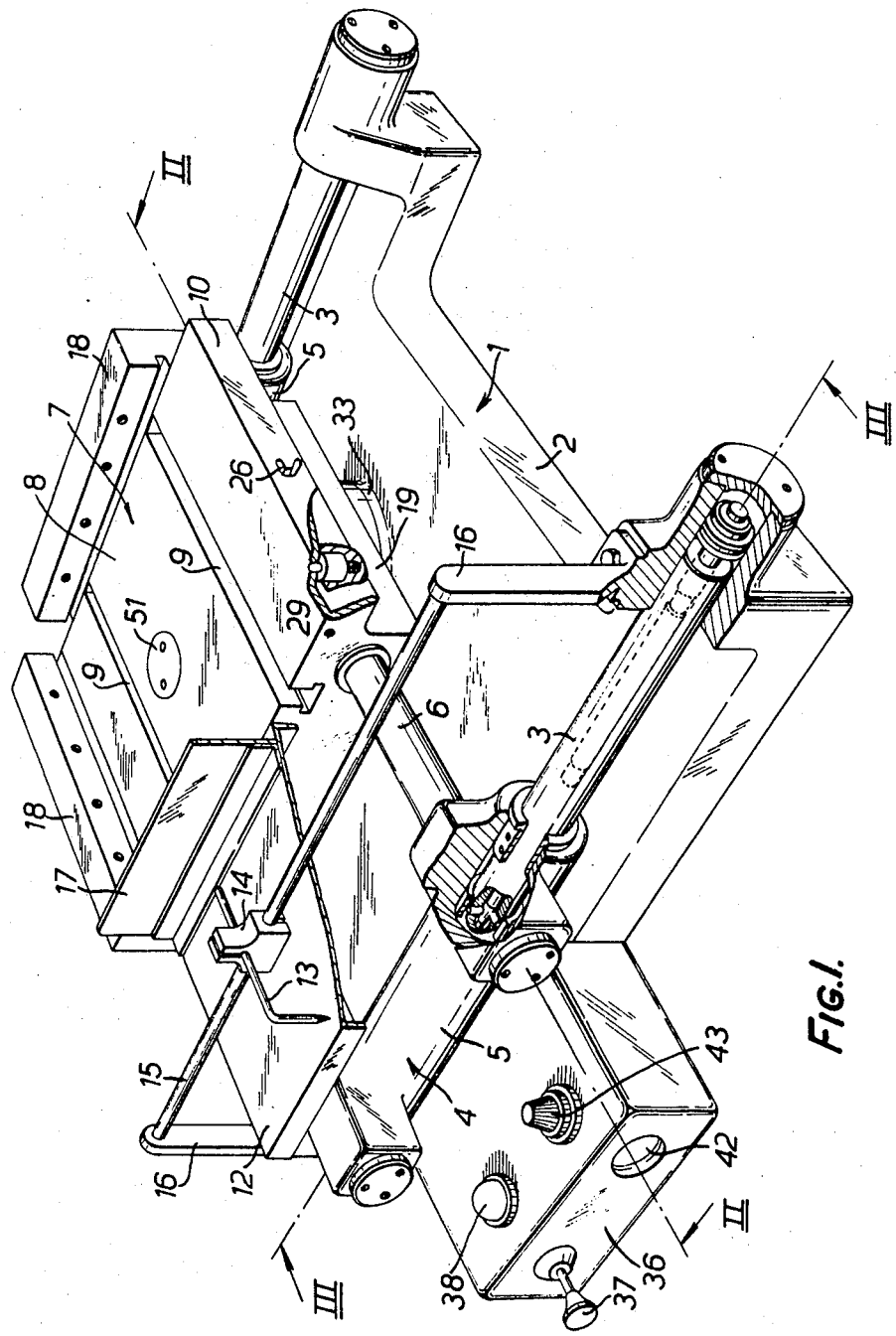

This invention relates to indexing means, and in particular to means for indexing a machine table which is arranged for two-dimensional movement in its own plane. It is of particular, but by no means exclusive application to the indexing of a drilling table movable with respect to rectangular coordinates.

According to the invention means for indexing a machine table arranged for two-dimensional movement in its own plane comprise detent means which are fixed in the sense that they do not move with the table, and an index plate for attachment to the table and formed at specific positions for engagement by the detent means which thereby locate the plate and hence the table in any one of the corresponding index positions so that the table can be securely clamped or otherwise locked in position while so located.

In a preferred construction of table employing the invention the index plate is attached beneath the table and has holes bored in it at the index positions, these holes being selectively engageable by a pneumatically-operated plunger of the detent means which are fixed to a base beneath the table and on which the latter is mounted. Coordinates wtih respect to which the table is movable may be defined by cylindrical slide bars, and the table may itself be slidable on a pair of spaced and parallel bars which themselves form part of a subframe slidable on a further pair of spaced and parallel bars which are fixed to the base and arranged at right angles to the first pair. When the indexing means operate pneumatically, as by use of a pneumatically-operated plunger fixed to the table base, clamping of the table is conveniently also achieved pneumatically. With the described arrangement of cylindrical slide bars pneumatically-operated clamping pads mounted on each bar may be urged apart to provide the clamping action by an expander cone or wedge cam actuated, while a machining operation is carried out in the indexed position, by a pneumatically-operated pushrod slidable centrally within the corresponding bar.

According to another aspect of the invention a machine table, for example a drilling table, is arranged for movement in two coordinates with respect to which it can be clamped in an indexed position, and is provided with indexing means including an index plate fixed or adapted to be fixed beneath the table and engageable at the index positions by detent means such as a pneumatically-operated plunger in order to locate the table in any one of the index positions at the time of clamping.

The pneumatically-operated plunger assembly may be arranged to support the table against the drilling pressure and hence eliminate flexing of the guide bars. Preferably the index plate is held in position by fixing screws passing through the table, with the plate located by means of dowels in the table.

The invention is particularly suitable for application to a machine table which is moved by hand between the index positions, and the latter can be chosen at any desired points within the full range of movement of the table. The index plates can be readily interchangeable in order to provide a completely different set of index positions.

Although it is normally desirable that the index plate should be fixed to the table, as has been described, the merits of the invention may be obtained by moving the table with respect to the index plate which then carries the detent means. Thus, according to a further aspect of the invention a machine table assembly comprises a table structure mounted for two-dimensional movement with respect to a base structure and is provided with indexing means comprising an index plate, fixed or adapted to be fixed to one of said structures, and detent means carried by the other of said structures for engagement with the index plate.

Figure 2:
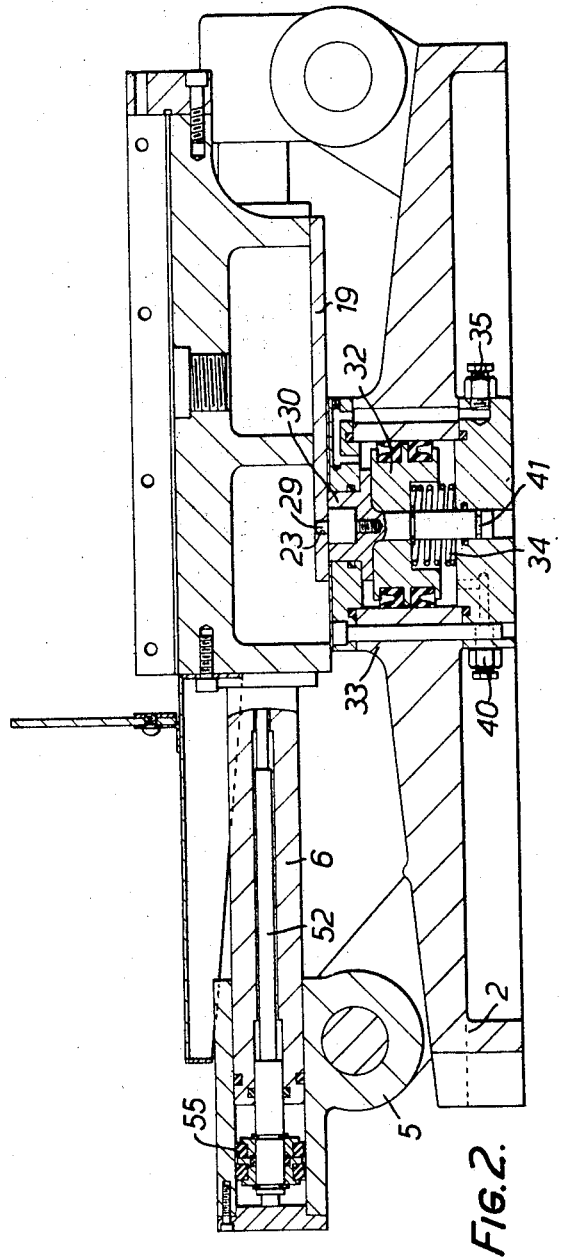
Figure 3:
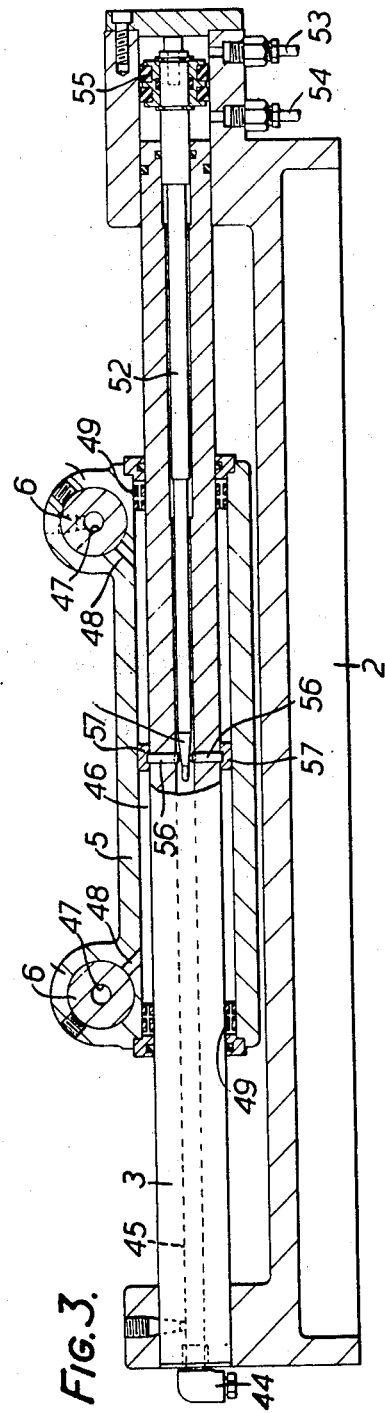
Figure 4:
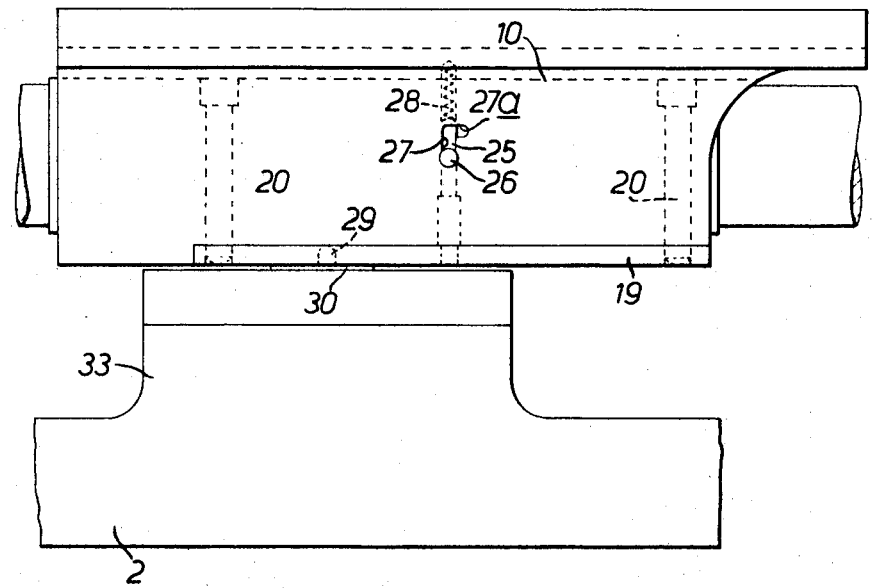
Figure 5:
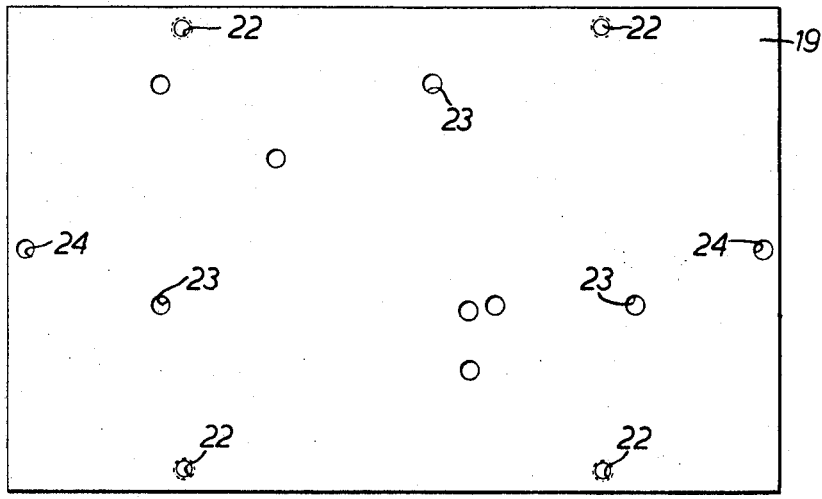
Figure 6:
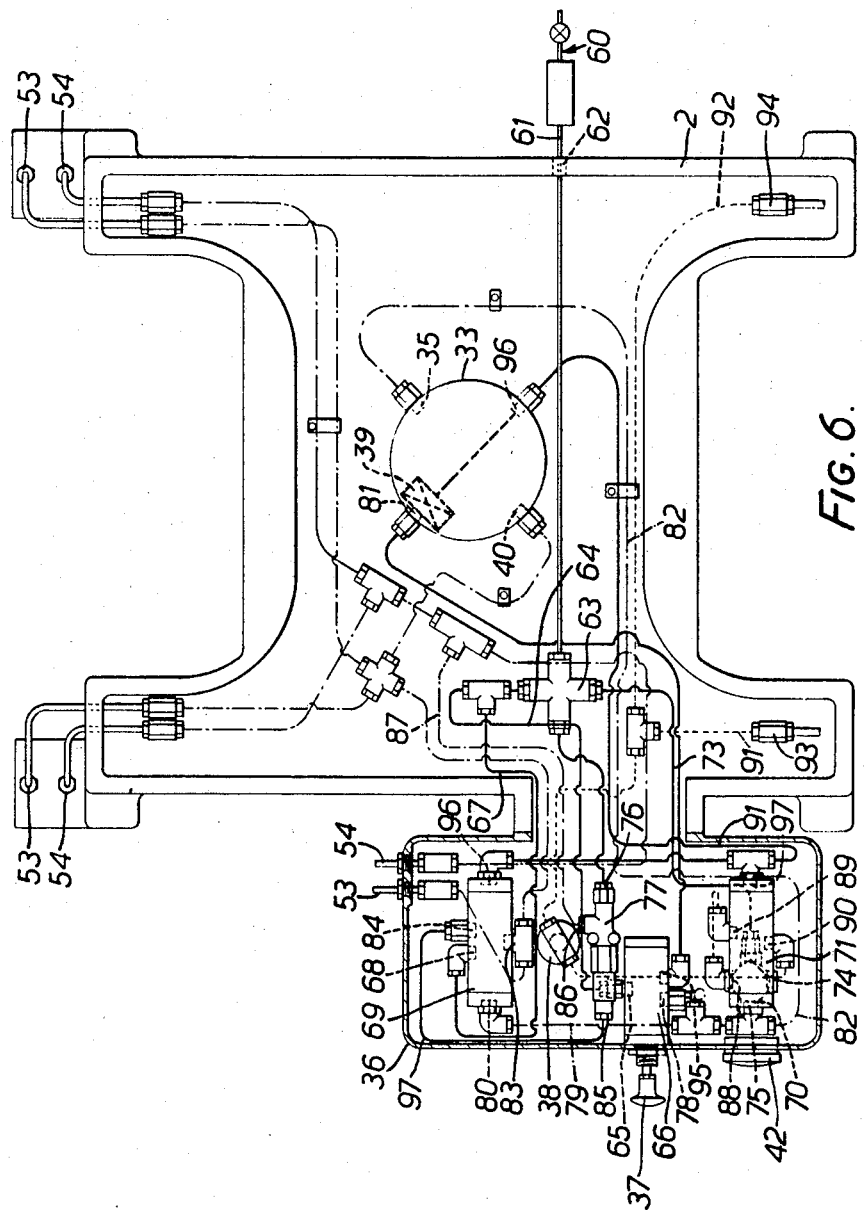

The invention will now be further described with reference to the accompanying drawings which illustrate, by way of example, a drilling table in accordance with the invention and movable with respect to two rectangular coordinates. In the drawings:

FIG. 1 is a perspective view of the table partially cut away and sectioned to show hidden detail,
FIG. 2 is a sectional view on the line II—II in FIG. 1,
FIG. 3 is a sectional view on the line III—III in FIG. 1,
FIG. 4 is a somewhat diagrammatic scrap side view,
FIG. 5 illustrates a typical index plate of indexing means of the table, and
FIG. 6 is a pneumatic control circuit diagram.

As can be seen clearly from FIG. 1 the complete table can be considered as comprising three main substructures. These, which will be described in greater detail mainly with reference to the remaining figures, comprise a base structure 1 in the form of a flat aluminium base casting 2 on which are supported two fixed and laterally extending cylindrical and parallel slide bars 3; a subframe structure 4 including two cast aluminium yokes 5 of generally tubular form which are slidable on the slide bars 3 and between which are supported two further cylindrical and parallel slide bars 6 which extend fore-and-aft of the table, i.e., at right angles to the slide bars 3; and a table structure 7 which is slidable on the slide bars 6 and presents a flat horizontal table surface 8 formed with the usual T-slots 9 to allow a work-holding fixture to be clamped to the surface 8 which is formed on a Meehanite casting 10.

The table casting 10 is thus slidable on the bars 6 to define one coordinate axis, and is slidable with the subframe structure 4 on the other pair of bars 3 to define the other coordinate axis. A metal tray 12 which is attached to the front of the table casting 10 and extends the full width of the latter provides a surface to which a component drawing can be fixed for cooperation with a bent pointer 13. This pointer can be slid to an adjusted position in a knuckle joint 14 which is itself slidable to an adjusted position on a support rod 15 which extends laterally above the tray 12 between two upstanding brackets 16 of the base casting 2. A transparent perspex chip guard 17 is fitted at the rear of the tray 12, and component location strips 18 are attached to the rear and left-hand side of the table casting 10. Thus with the component correctly located and clamped to the table surface 8 the pointer 13 can be adjusted so that it indicates on the component drawing the effective drilling point on the table, and hence the pointer can be utilised for approximate location of the component with respect to the two coordinate axes for each hole to be drilled prior to positive location by the indexing means which will now be described.

The indexing means which are shown somewhat diagrammatically in FIG. 1 are illustrated in detail in FIGS. 2, 4 and 5. They comprise a replaceable index plate 19 which is fixed to the under-surface of the table casting 10 and held in position by socket cap screws 20 which pass through the casting 10 and engage threaded holes 22 in the plate 19. The plate 19 is bored with through holes such as 23 at a number of index points to suit the predetermined drilling programme, and it also has two dowel holes 24 for accurate location and which are engaged by spring-loaded dowel plungers 25 which are respectively disposed adjacent the side edges of the casting 10 and slidable therein.

The right-hand side plunger 25 is illustrated in FIG. 4, and as can be seen therefrom each plunger 25 has a projecting side arm 26 which projects through an L-shaped slot 27 in the casting 10. This enables the plunger 25 to be raised against a spring 28 to a retracted position in which it is retained by engagement of the arm 27 in the upper limb 27a of the slot 27, so that the plunger 25 operates in the manner of a latch. The plate 19 is initially fitted with the two plungers 25 in the retracted position and loosely attached by means of the screws 20. The plungers 25 are then released and engaged with the dowel holes 24 to locate the plate 19 accurately, the screws 20 then being tightened. A pneumatically operated plunger 29, see particularly FIG. 2, is an accurate fit in each of the index holes 23 and is mounted on a carrier 30 which is slidable, together with a pneumatic actuating piston 32, in a plunger housing 33 in the base casting 2. Thus the plunger 29 is selectively engageable with the index holes 23 to locate the table casting 10 in the coersponding index positions in turn, and when accurately indexed the table is clamped in position by pneumatic clamping means and supported pneumatically as will be described.

The plunger 29 is urged towards its upper indexing position shown in FIG. 2 by a spring 34 below the piston 32 within the housing 33, and when it is desired to reindex the table pressure air is introduced above the piston 32 through a connection 35, and this lowers the plunger 29 against the spring 34 to permit table movement to a new position. A pneumatic control console 36 is attached to the base casting 2 at the front thereof and supports a push-pull control lever 37. This is depressed to admit the pressure air above the piston 32 when it is desired to free the plunger 29. A pneumatically operating warning indicator 38 on the console 36 is energised to show a red flag when the button 37 is depressed and this provides a visual warning that the table is free and machining may not take place, and when the table has been approximately positioned by hand utilising the pointer 13 the lever 37 is pulled back. This cuts off the pressure air supply to the housing 33 with the result that the plunger 29 lightly engages the index plate 19 under the action of the spring 34. When the plunger is accurately aligned with the new index hole 23 it is engaged therein by the spring 34, and when fully home an automatic sensor valve 39 (shown diagrammatically in FIG. 6) operates and results in the supply of pressure air to below the piston 32 through a connection 40. The valve 39 is actuated by alignment of a port with a recess 41 in a guide plunger portion of the carrier 30. The indicator 38 is simultaneously deenergised and the pressure air not only maintains the plunger in engagement with the index plate but also urges the plunger support 30 against the under surface of the plate 19 to provide a platform support which overcomes any pressure exerted on the workpiece during drilling. This results in high drilling accuracy and flexing of the slide bars 3 and 6 is completely eliminated.

To facilitate easy movement of the table by hand between the index positions the table casting 10 is mounted on the slide rod 6 and the tubular yokes 5 are mounted on the slide rods 3 through air bearings which are supplied with low-pressure air when the lever 37 is pressed inwards to free the detent plunger 29, the bearing air being cut off with the low-pressure supply as described when the higher-pressure air is supplied to engage the indexing means. A similar arrangement of spaced air bearings is employed for each slide rod, and the arrangement for the front slide rod 3 is shown in detail in FIG. 3. A pressure gauge 42 mounted on the console 36 indicates the low air pressure value, and this can be adjusted by means of a knob 43 which controls a pressure regulator valve. Referring now to FIG. 3, the low-pressure air is supplied through a connection 44 to a central bore 45 in the hardened and accurately ground steel guide bar 3, and this air passes into a surrounding clearance 46 within the corresponding tubular yoke 5 which has cast yoke ears 41 within which the fore-and-aft slide bars 6 are fixed. The air is supplied to the central bores 47 of the bars 6 through drillings 48, in each bearing arrangement the low-pressure air feeding two air bearing bushes such as 49.

The pneumatic clamping means which have been referred to consist of four generally similar and separately operating but simultaneously energised clamping devices respectively associated with the four slide bars 3 and 6, one such device being illustrated in detail in FIG. 3 and another partly in FIG. 2 which for like parts utilises the same reference numerals. Referring again to FIG. 3, at the end remote from the low-pressure bearing air connection 44 the rod 3 is supported in a clamping cylinder 50 of the base casting 2, and at that end an actuating push-rod 52 is slidable in the central bore 45 of the rod 3. Pressure air connections 53 and 54 respectively enable the high-pressure air to be supplied to the outer and the inner sides of a piston 55 mounted at the outer end of the rod 52 which at its inner end has a taper portion 52a which acts as a wedge cam on a ring of six expander rods 56 slidable in radial bores in the guide rod 3. The rods 56 in turn act on two friction clamping pads 57 which are each of generally semicircular shape and which are expanded outwards to grip the yoke member 5 in order to lock the subframe structure 4 in an indexed position.

When the lever 37 is pushed in to free the table high-pressure air is supplied through the connection 54 to withdraw the pushrod 52 and relieve the clamping action, the other clamping devices being similarly actuated at the same time. On application of the high-pressure air to the detent means the same pressure is applied through the connection 53, thus expanding the friction pads to provide a rigidly clamped table assemby which is immovable under normal machining forces, all the clamping devices being clamped simultaneously.

The pneumatic control circuit and a complete operative cycle thereof will now be described with reference to FIG. 6 of the drawings. High-pressure air is supplied through a line 61 to a tapping 62 in the base casting 2, the line 61 containing a high-pressure filter lubricator of the type known as a "Micro-Fog Vitalizer Unit" and pressure regulator 60. This unit not only cleans the air but introduces oil thereto, which acts as a lubricant for the various pneumatic devices, which have been described, and in particular for the slide bar bearings 49.

The high-pressure line 61 within the base casting 2 is directed to a 4-way connector 63 from whence a line 64 supplies high-pressure air to a control valve 66 through a connection 65, this valve being manually operated by the control lever 37. A further line 67 supplies high-pressure air to a pilot-operated valve 69 through a connection 68. An impulse valve 77 and a low-pressure regulator valve 75 which is controlled by the knob 43 (FIG. 1)

are also connected to the high-pressure air supply at connections 76 and 74 respectively.

When the control lever 37 is pushed in, to free the table, the valve 66 is changed over, and as a result high-pressure air from an outlet connection 78 of valve 66 is supplied through a line 79 to the valve pilot connection 80 of the valve 69 and the valve pilot connection 70 of a second pilot-operated valve 71, and through a line 82 to the connection 35 of the plunger housing 33 and the pressure therein thus acts to change over valves 69 and 71 and also withdraw the index plunger 29. Exhaust air from the bottom of the plunger housing 33 is returned from the connection 40 to the valve 69 at a connection 83, and passes through this valve to a connection 84 thereof and thus through a line 97 to the impulse valve 77 at a connection 85. Operation of the impulse valve 77 allows a surge of high-pressure air from the high-pressure connection 76 thereof to be directed via a connection 86 and a line 87 to tappings such as 54 (see FIG. 3) to operate the clamp pistons and unclamp the table. Thus, the manual operation of the valve 66, by depression of the lever 37, acts directly to unclamp all of the clamping devices and to withdraw the detent plunger 29.

The application of high-pressure air to the valve pilot 70 causes the valve 71 to change over to provide the bearing low-pressure air supply, an outlet connection 88 of the regulator valve 75 being connected, through a low-pressure line, to an inlet 89 of the valve 71. Change over of the valve 71 supplies the low-pressure air from a valve outlet 90 to the indicator 38, to make it clear to the operator that the table is unclamped, and through lines 91 and 92 to the two right-hand side connectors 93 and 94 in the base casting 2. Pipes are then carried from these connectors to the ends of the longitudinal bars and connected at 44 (see FIG. 3) and subsequently supply all the air bearings with low-pressure air.

When the table has been moved to the next index position, approximately, the control lever 37 is pulled out, as already described, and this cuts off the high-pressure air supply to the valve pilots 80 and 70 and to the plunger housing connection 35, thus exhausting above the plunger piston. High-pressure air from a connection 95 of the valve 66 is carried to the sensor device at a connection 81 of the sensor valve 39 and, only if the location plunger 29 has accurately engaged the index plate, continues through the sensor groove 41 (see FIG. 2) to a connection 96 from whence it passes via a line 91 to the valve pilot connections 96 and 97 of the valves 69 and 71 and, due to the removal of pressure at the pilot connections 70 and 80 causes these valves to change over. High-pressure air from the connection 83 on the valve 69 is then supplied to the table clamp cylinder tappings such as 53 (see FIG. 3) and to the connection 40 of the plunger housing 33 which urges the plunger 29 fully into engagement with the index plate 19. With the simultaneous change over of valve 71 the low-pressure air supply to the bearings is cut off thus allowing full clamping of the table to be facilitated, likewise the indicator 38 now registers that the table is in the indexed position and fully clamped.

A removable inspection plate 51 let into the table surface 8 and held in position by two screws permits inspection of the detent plunger assembly. With the plate 51 removed and the aperture which it blanks off positioned above the housing 33 the complete plunger assembly, including the piston 32, can be removed for maintenance purposes.

I claim:

1. A machine table construction comprising a base structure, a table arranged for two-dimensional movement in its own plane above the base structure and along coordinates defined by slide bars on which the table is supported, pneumatically-operated detent means fixed to the base structure, an index plate attached to the table and formed at specific positions for engagement by the detent means to locate the table in index positions, and pneumatic clamping means for clamping the table in a located position and comprising clamping pads mounted on each slide bar and urged apart to provide the clamping action by an expander wedge arrangement actuated by a pneumatically operated pushrod slidable within the corresponding slide bar.

2. A machine table construction according to claim 1, wherein said slide bars consist of a pair of spaced parallel slide bars defining one of said coordinates and which forms part of a subframe, and a further pair of spaced parallel slide bars on which the subframe is slidable and which define another of said coordinates, said further slide bars being fixed on the base structure and arranged at right angles to the first pair.

3. A machine table construction comprising a base structure, a table arranged for two-dimensional movement in its own plane and slidable on a pair of spaced and parallel slide bars which themselves form part of a subframe slidable on a further pair of spaced and parallel slide bars which are fixed on the base structure and arranged at right angles to the first pair, pneumatic clamping means associated with each slide bar to clamp the table in an index position, pneumatic control means which operate to energise the clamping means when pneumatic pressure is applied to the detent means to urge the latter into engagement with the index plate, pneumatically-operated detent means fixed on the base structure below the table, an index plate attached to and below the table and with holes bored at index positions, said detent means comprising a plunger which projects from a carrier member associated with a double-acting pneumatic piston which is movable upwardly by pneumatic pressure to an indexing position in which the plunger engages a selected one of said holes to locate the table in an index position and in which the carrier member engages the index plate so as to act as a support platform for the table to withstand downward machining pressure on the table with the upward movement of the carrier member positively limited to define a table support position at a predetermined height below the table, the plunger and carrier member being movable downwardly also under pneumatic pressure by said double-acting piston to withdraw the plunger from the index plate with attendant movement of the carrier member away from the support position.

4. A machine table construction according to claim 3, wherein the table and subframe structure are slidably suported on the respective slide bars through air bearings, said control means being such that the air bearings are supplied with pressure air when the index means are free to allow table movement.

5. A machine table construction according to claim 4, wherein said control means comprise a manual control member which in one position frees the detent means, unclamps the table, and supplies the air bearings, which control member has another position corresponding to engagement of the detent means and clamping of the table.

6. A machine table construction according to claim 5, wherein a pneumatic sensor associated with the indexing means ensures that until the index plunger is accurately engaged with the index plate the pneumatic clamping pressure is not applied.

7. A machine table construction according to claim 4, wherein the table and the subframe each have a pair of tubular portions which surround the respective slide bars so as to be concentric therewith, said air bearings being disposed at each end of each tubular portion and said clamping means comprising, for each slide bar, clamping pads mounted on that slide bar and an expander wedge arrangement within the slide bar operative to urge the pads downwardly into frictional clamping engagement with the bore of the corresponding tubular portion, the wedge arrangement being actuated by a pneumatically-operated pushrod slidable centrally within the slide bar and associated with a pneumatic piston slidable in a pneumatic cylinder at the end of the slide bar.

8. A machine table construction according to claim 7, wherein said wedge arrangement comprises an expander cone at the end of the pushrod and operative to displace a ring of radially arranged expander rods which engage the clamping pads.

9. A machine table construction comprising a base structure, a table arranged for two-dimensional movement in its own plane above the base structure, pneumatically-operated detent means fixed on the base structure below the table, an index plate attached to and below the table and with holes bored at index positions, said detent means comprising a plunger which projects from a carrier member and which is movable upwardlp by pneumatic pressure to an indexing position in which the plunger engages a selected one of said holes to locate the table in an index position and in which the carrier member engages the index plate so as to act as a support platform for the table to withstand downward machining pressure on the table with the upward movement of the carrier member positively limited to define a table support position at a predetermined height below the table, the plunger and carrier member being spring loaded into initial engagement with the index plate before pneumatic pressure is applied to retain them in the indexing and support positions respectively, and the plunger and carrier member being movable downwardly also under pneumatic pressure to withdraw the plunger from the index plate with attendant movement of the carrier member away from the support position.

References Cited
UNITED STATES PATENTS

| | | | |
|---|---|---|---|
| 3,267,772 | 8/1966 | Burg | 77—64 |
| 3,240,085 | 3/1966 | Eppler | 77—64 |
| 3,163,057 | 12/1964 | Drummond et al. | 77—64X |
| 2,827,808 | 3/1958 | Charlat | 77—64 |

FRANCIS S. HUSAR, Primary Examiner

U.S. Cl. X.R.

90—58